United States Patent
Cai et al.

(10) Patent No.: US 10,621,428 B1
(45) Date of Patent: Apr. 14, 2020

(54) LAYOUT ANALYSIS ON IMAGE

(71) Applicant: NEXTVPU (SHANGHAI) CO., LTD., Shanghai (CN)

(72) Inventors: Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/457,691

(22) Filed: Jun. 28, 2019

(30) Foreign Application Priority Data

May 17, 2019 (CN) .......................... 2019 1 0408949

(51) Int. Cl.
*G06K 9/00* (2006.01)
*G06T 7/11* (2017.01)
*G06F 40/103* (2020.01)

(52) U.S. Cl.
CPC ............ *G06K 9/00463* (2013.01); *G06T 7/11* (2017.01); *G06F 40/103* (2020.01); *G06K 2209/01* (2013.01); *G06T 2207/30176* (2013.01)

(58) Field of Classification Search
None
See application file for complete search history.

(56) References Cited

U.S. PATENT DOCUMENTS

| 6,782,384 B2 * | 8/2004 | Sloan ....................... G06F 17/22 |
| 2009/0169061 A1 | 7/2009 | Anderson et al. |
| 2015/0095769 A1 * | 4/2015 | Zhang ................ G06K 9/00456 715/243 |
| 2015/0242096 A1 * | 8/2015 | Carro ................... G09B 21/001 715/277 |

FOREIGN PATENT DOCUMENTS

| CN | 101136010 A | 3/2008 |
| CN | 102479173 A | 5/2012 |

(Continued)

OTHER PUBLICATIONS

Thomas M. Breuel ("Two Geometric Algorithms for Layout Analysis" Document Analysis Systems V, 5th International Workshop, DAS 2002 Princeton, NJ, USA, Aug. 19-21, 2002 Proceedings, pp. 1-12) (Year: 2002).*

(Continued)

*Primary Examiner* — Wei Wen Yang
(74) *Attorney, Agent, or Firm* — Seed IP Law Group LLP

(57) ABSTRACT

The present application relates to layout analysis on an image. The layout analysis method includes: dividing, based on coordinate information of a plurality of paragraphs in an image, the plurality of paragraphs into one or more columns arranged in a horizontal direction, each column including one or more paragraphs of the plurality of paragraphs; for one or more paragraphs included in each of at least some of the one or more columns, determining a main paragraph in the column based on a first criterion related to geometric information of a paragraph; and for each of the columns, if one or more non-main paragraphs and the main paragraph in the column satisfy a geometric relationship for adding a main paragraph, taking the one or more non-main paragraphs as additional main paragraphs to the main paragraph.

20 Claims, 9 Drawing Sheets

(56) References Cited

FOREIGN PATENT DOCUMENTS

| | | |
|---|---|---|
| CN | 104268127 A | 1/2015 |
| CN | 106802884 A | 6/2017 |
| CN | 108932221 A | 12/2018 |
| JP | 5-314302 A | 11/1993 |
| JP | 6-214983 A | 8/1994 |
| JP | 7-192084 A | 7/1995 |
| JP | 9-319746 A | 12/1997 |
| JP | 2000-311167 A | 11/2000 |
| JP | 2001-92921 A | 4/2001 |
| JP | 2009-251872 A | 10/2009 |
| JP | 2009-266009 A | 11/2009 |
| JP | 2015-146122 A | 8/2015 |
| WO | 2014/050562 A1 | 4/2014 |

OTHER PUBLICATIONS

Chinese Notice of Allowance, dated Jul. 3, 2019, for Chinese Application No. 201910408949.8, 5 pages. (with English translation).

Yonghui, "Layout analysis and understanding," *Language Applications* (12), 1997, 16 pages. (with English translation).

Jian Liang et al., "Camera-based analysis of text and documents: a survey," IJDAR, 7: 84-104, Jun. 21, 2005.

\* cited by examiner

LAYOUT ANALYSIS ON IMAGE

CROSS-REFERENCE TO RELATED APPLICATIONS

The present application claims priority to and is entitled to the benefit of Chinese Patent Application No. 201910408949.8, filed May 17, 2019, the entire content of which is incorporated herein by reference for various purposes.

BACKGROUND

Technical Field

The present disclosure relates to the field of data processing, and in particular to a layout analysis method, a reading assisting device and a non-transitory computer readable storage medium.

Description of the Related Art

There are related technologies for recognizing character in a reading material layout that is contained in an image. In practical applications, the image may include not only the reading material layout but also character in a background object (background character) irrelevant to the reading material layout, so that the character in the image can be refined to remove the background character. The layout refining technique in the related art mainly relies on image data of character, character strings or semantic information of character, etc., to determine, by means of image processing or a semantic analysis algorithm, which character is the background character to be removed. Such techniques are usually algorithmically complex and computationally heavy.

The methods described in this section are not necessarily the methods that have been previously conceived or employed. Unless otherwise indicated, it should not be assumed that any of the methods described in this section are considered to be the prior art only because they are included in this section. Similarly, the problems mentioned in this section should not be considered to be universally recognized in any prior art, unless otherwise indicated.

BRIEF SUMMARY

According to an aspect of the present disclosure, a computer-implemented layout analysis method is provided, the method including the following steps executed by a processor: dividing, based on coordinate information of a plurality of paragraphs in an image, the plurality of paragraphs into one or more columns arranged in a horizontal direction, each column including one or more paragraphs of the plurality of paragraphs; for one or more paragraphs included in each of at least some of the one or more columns, determining a main paragraph in the column based on a first criterion related to geometric information of a paragraph; for each of the columns, if a geometric relationship between a non-main paragraphs and the main paragraph in the column satisfies a second criterion on geometric relationship for adding a main paragraph, classifying the non-main paragraphs as an additional main paragraphs to the main paragraph; performing character recognition on the image to obtain character data; and converting character data in a main paragraph into sound data according to a layout analysis result.

According to another aspect of the present disclosure, a reading assisting device, the device comprising: a sensor configured to acquire an image; a integrated circuit, the chip circuit including: a first circuit unit configured to execute the steps of the method according to the present disclosure, and the chip circuit further including: a second circuit unit configured to perform character recognition on the image to obtain character data, and a third circuit unit configured to convert character data in a main paragraph into sound data according to a layout analysis result; and a sound output device configured to output the sound data.

According to another aspect of the present disclosure, a non-transitory computer readable storage medium storing executable instructions is provided, wherein the executable instructions, when executed by a processor of an electronic device, cause the electronic device to execute the method according to the present disclosure.

More features and advantages of the present disclosure will become apparent from the exemplary embodiments described below with reference to the accompanying drawings.

BRIEF DESCRIPTION OF THE SEVERAL VIEWS OF THE DRAWINGS

The accompanying drawings exemplarily shows the embodiments and constitute a part of the Description for interpreting the exemplary implementations of the embodiments together with the character description of the Description. The embodiments shown are merely for illustrative purposes and do not limit the scope of the claims. In all the figures, the same reference signs refer to similar but not necessarily identical elements.

DETAILED DESCRIPTION

Figure 1:
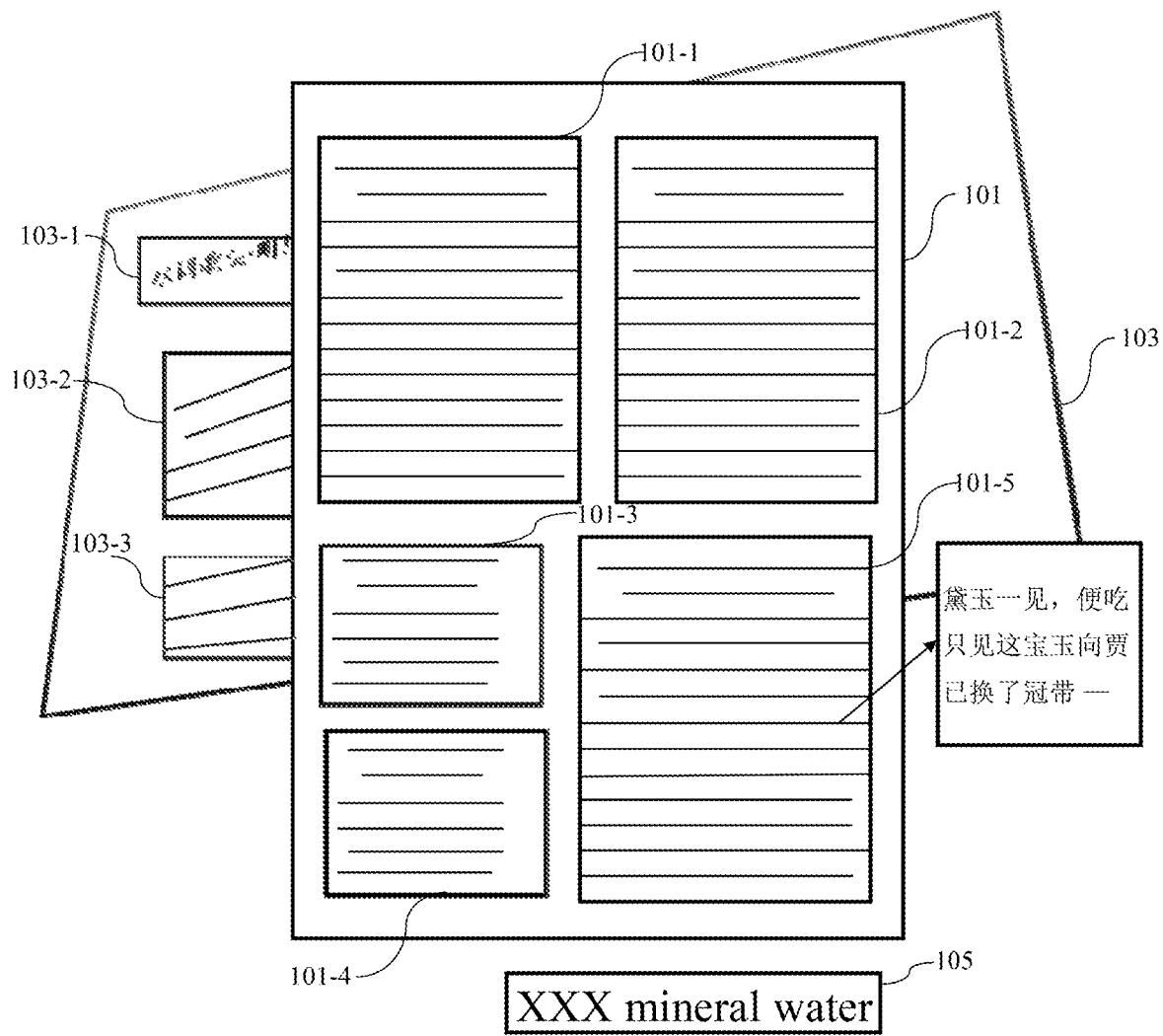
FIG. 1 is a schematic diagram showing an example of an image including a reading material layout and background character according to an exemplary embodiment of the present disclosure.

In the present disclosure, unless otherwise stated, the terms "first," "second," etc., used to describe various elements are not intended to limit the positional, temporal or importance relationship of these elements, but rather only to distinguish one component from the other. In some examples, the first element and the second element may point to the same instance of the elements, and in some cases, based on contextual descriptions, they may also refer to different instances.

The terms used in the description of the various examples in the present disclosure are merely for the purpose of describing particular examples, and are not intended to be limiting. Unless the context clearly indicates otherwise, if the number of elements is not specifically defined, the elements may be one or more. Moreover, the term "and/or" used in the present disclosure encompasses any of and all possible combinations of listed items.

In the present disclosure, for an image, "horizontal" refers to a direction of an image side that is substantially parallel (e.g., an angle less than 45 degrees) to a character line, and "vertical" refers to a direction of another image side that is vertical to "horizontal."

The following description of the present disclosure is mainly based on the case where character lines extend in a substantially left-right direction (i.e., a horizontal reading material) with respect to a reader, but the technical solution of the present disclosure is not limited thereto. The technical solution of the present disclosure is also applicable to the case where character lines extend in a substantially up-down direction (i.e., a vertical reading material) with respect to the reader, i.e., the algorithm of the present disclosure is also applicable to the case of a vertical version reading materials. In the case where character lines extend in a substantially up-down direction, the horizontal direction in the present disclosure may mean substantially the up and down direction, and the vertical direction may mean substantially the left and right direction. In other words, the terms "horizontal," "vertical," and the like in the present disclosure do not have absolute meanings, as long as they are two directions vertical to each other instead. In the case where character lines are in substantially the up and down direction, the "up and down" and "left and right" directions in the present disclosure may be interchanged.

In the present disclosure, the threshold may be an absolute value of each parameter, or a ratio (e.g., a multiple or a fraction of a certain absolute value).

In the application of character recognition on a reading material (e.g., a book, a magazine, etc.) layout included in an image, there may be the case where the image includes not only characters in the reading material layout, but also characters in a background object (background characters) irrelevant to the reading material layout. In order to process only the characters in the reading material layout desired by the user during character recognition, and avoid the interference of the background characters, a layout refining technique may be used to determine which are background characters and remove the background characters. "Layout refining" means retaining only character in the image that should be recognized to belong to the reading material layout, or removing character from the image that should not be recognized to belong to the reading material layout.

The present disclosure provides a layout analysis (layout refining) method, which avoids complicated image processing directly on a character image, and does not need to perform semantic analysis based on character, but uses coordinate information of each paragraph obtained by means of paragraph division processing to perform layout refining in units of paragraphs.

FIG. 1 is a schematic diagram showing an example of an image including a reading material layout and background character according to an exemplary embodiment of the present disclosure. In the example of FIG. 1, the image includes a reading material layout 101, the reading material layout 101 includes paragraphs 101-1 to 101-5, and there may be, for example, a plurality of illustrated character lines in each of the paragraphs. The image further includes, for example, a background object, i.e., a tablet computer 103, which is irrelevant to the reading material layout 101, and the tablet computer 103 may include paragraphs 103-1 to 103-3 displayed on its screen. Moreover, the image also includes, for example, a paragraph 105 for character on a mineral water package. According to the layout analysis method of the present disclosure, the layout may be refined based on the coordinate information of each paragraph in the image, so that the paragraphs 101-1 to 101-5 are determined to be layout paragraphs of the image, and the paragraphs 103-1 to 103-3 and the paragraph 105 are determined to be background paragraphs of the image. According to some embodiments of the present disclosure, the character in the main paragraphs may be sequentially converted into sound, and the sound is output through a sound output device such as a speaker or a headphone.

The exemplary embodiments of the layout analysis method of the present disclosure will be further described below with reference to the accompanying drawings.

Figure 2:
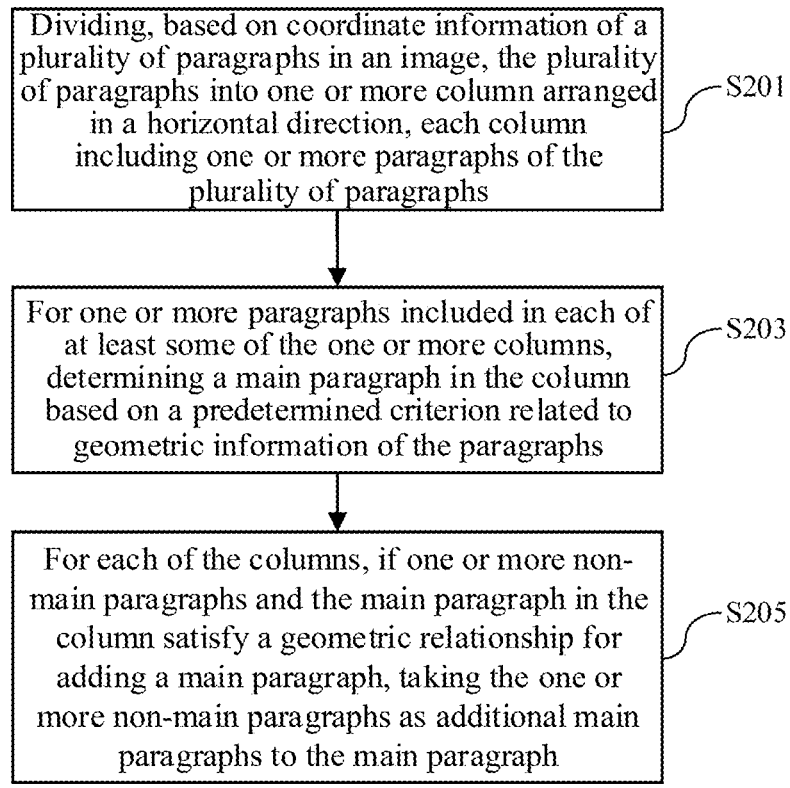
FIG. 2 is a flow chart showing a layout analysis method according to an exemplary embodiment of the present disclosure.

FIG. 2 is a flow chart showing a layout analysis method according to an exemplary embodiment of the present disclosure. As shown in FIG. 2, the layout analysis method may include, for example, the following steps executed by a processor: performing column division on paragraphs in an image (step S201), determining a main paragraph of each column (step S203), and obtaining an additional main paragraph to the main paragraph by extending the existing main paragraph in each column (step S205).

In step S201, based on coordinate information of a plurality of paragraphs in an image, the plurality of paragraphs are divided into one or more columns arranged in a horizontal direction, each of the columns including one or more paragraphs of the plurality of paragraphs.

Compared with the background paragraphs in the image, the layout paragraphs in the image have relatively compact relative positions in a vertical direction, and present a good overlapping performance (i.e., alignment) in the horizontal direction. Therefore, the column division on the plurality of paragraphs in the image can facilitate preliminary division of the layout paragraphs from the background paragraphs, and can also prepare for further division within columns later.

Here, coordinate information of a paragraph refers to coordinate information capable of expressing the position of the paragraph in the image and the occupied region, and may be in various forms. For example, the coordinate information of a paragraph may be coordinates of four vertexes of a rectangle containing the paragraph (e.g., a minimum rectangle containing the paragraph, or a rectangle obtained by extending the minimum rectangle containing the paragraph upwards, downwards, leftwards and/or rightwards by a certain multiple), or coordinates of any vertex of the paragraph and the length and width of the paragraph, but is not limited to the specific forms.

In the example shown in FIG. 1, paragraphs 103-1 to 103-3 may be divided into one column, paragraphs 101-1, 101-3 and 101-4 may be divided into one column, and paragraphs 101-2, 101-5 and 105 may be divided into one column.

In step S203, for one or more paragraphs included in each of at least some of the one or more columns, a main paragraph in the column is determined based on a predetermined criterion related to geometric information of the paragraphs.

In this step, at least some of the one or more columns are considered to be columns containing layout paragraphs. Because the column containing layout paragraphs may also include background paragraphs, a paragraph that is most likely to be a layout paragraph (a main paragraph) in the column is determined, in this step, to be used as an initial main paragraph in the column, and thus other main paragraphs (additional main paragraphs) in the column are further obtained by extending the main paragraph in subsequent steps. There may be only one main paragraph (i.e., the initial main paragraph) in one column, or a plurality of main paragraphs (i.e., the initial main paragraph and additional main paragraphs) therein.

The geometric information may be information related to at least one of the size of the paragraph, the position of the paragraph (including a relative positional relationship), the inclination of character lines, the number of character lines, the size of a character line, etc. The predetermined criterion related to the geometric information of the paragraphs means a predetermined criterion for the paragraph in terms of at least one of the size of the paragraph, the position of the paragraph (including a relative positional relationship), the inclination of character lines, the number of character lines, the size of a character line, etc.

According to some embodiments, the predetermined criterion for determining a main paragraph in the column may be based on at least one of the following factors: the width of the paragraph, the area of the paragraph, the number of character lines in the paragraph, and the distance between the center point of the paragraph and the center point of the image. For example, the greater the width of the paragraph, and/or the greater the area of the paragraph, and/or the greater the number of character lines in the paragraph, and/or the closer the distance of the center point of the paragraph from the center point of the image, the more likely the paragraph is to be determined as a main paragraph in the column.

In the example shown in FIG. 1, the at least some of the one or more columns (i.e., columns considered to contain the layout paragraphs) may be a column (referred to as column 1) where paragraphs 101-1, 101-3 and 101-4 are located, and a column (referred to as column 2) where paragraphs 101-2, 101-5 and 105 are located. In other words, the column where paragraphs 103-1 to 103-3 are located may be discarded because same is considered as an unqualified column (e.g., because the inclination of character lines is too large, or the width of the column is too narrow, etc.). In this example, paragraphs 101-1 and 101-5 are respectively determined as main paragraphs in columns 1 and 2, since they best satisfy the predetermined criterion related to the geometric information of the paragraphs. Being determined as the main paragraph in the column means being determined as the most likely layout paragraph in the column.

In step S205, for each of the columns, if one or more non-main paragraphs and the main paragraph in the column satisfy a geometric relationship for adding a main paragraph, the one or more non-main paragraphs are used as additional main paragraphs to the main paragraph.

In this step, on the basis of the determination of the main paragraph in each column, additional main paragraphs to the existing main paragraph are obtained by means of extension depending on whether the relative correlation between other paragraphs (current non-main paragraphs) and the existing main paragraph is higher (i.e., whether the geometric relationship for adding a main paragraph is satisfied).

The geometric relationship for adding a main paragraph refers to the correlation between a non-main paragraph and a main paragraph in terms of relative positions of the paragraphs, the size of the paragraphs, the inclination of character lines, the number of character lines, the size of a character line, etc. According to some embodiments, the geometric relationship for adding a main paragraph may include, for example, at least one of: an average character line height relationship, a character line inclination relationship, a paragraph border relationship (which may, for example, embody the distance between paragraphs), and a paragraph overlap rate relationship. The average character line height relationship between a non-main paragraph and a main paragraph may, for example, include the difference or ratio between an average height of character lines in the non-main paragraph (i.e., how high a character line is on average) and an average height of character lines in the main paragraph; the paragraph inclination relationship therebetween may include, for example, a difference angle between the inclination of character lines in the non-main paragraph and the inclination of character lines in the main paragraph; the paragraph border relationship therebetween may include, for example, a relative positional relationship between a paragraph border of the non-main paragraph and a paragraph border of the main paragraph (e.g., an upper, lower, left, or right positional relationship and/or a distance therebetween); and the paragraph overlap rate relationship may include, for example, an overlap rate between the non-main paragraph and the main paragraph in a horizontal/vertical direction. These conditions may be combined and applied in various ways according to application needs, and the order of application is not limited to a specific order. For example, the paragraph border relationship may be determined first, and then whether the other geometric relationships meet the requirement for adding a main paragraph is determined only when the paragraph border relationship is satisfied. For example, the average character line height relationship and the character line inclination relationship may be determined first, and then whether the other geometric relationships meet the requirement for adding a main paragraph is determined only when the two relationships are satisfied. The application method and application order of the geometric relationships in determining whether the requirement for adding a main paragraph is met are not limited to a particular application method and application order.

It should be noted that the initially determined main paragraph and the additional main paragraph belong to the conceptual category of main paragraphs, and these main paragraphs are considered as layout paragraphs to be further processed (for example, character-to-sound conversion and speech broadcast, etc.) at the end of processing. In addition, non-main paragraphs refer to paragraphs that have not yet been determined as main paragraphs during processing, but non-main paragraphs may be extended as main paragraphs (i.e., additional main paragraphs) in subsequent processing.

In the example shown in FIG. 1, paragraphs 101-1 and 101-5 have been respectively determined as main paragraphs in columns 1 and 2 in the previous step. Then in this step, since there is a high correlation between paragraph 101-3 and main paragraph 101-1 (i.e., the geometric relationship for adding a main paragraph is satisfied), paragraph 101-3 is determined as an additional main paragraph to main paragraph 101-1 in column 1. Thereafter, since there is a high correlation between paragraph 101-4 and main paragraph 101-3, paragraph 101-4 is determined as an additional main paragraph to main paragraph 101-3 in column 1. Similarly, since there is a high correlation between paragraph 101-2 and paragraph 101-5 (i.e., the geometric relationship for adding a main paragraph is satisfied), paragraph 101-2 is determined as an additional main paragraph in column 2. Since there is a low correlation between paragraph 105 and main paragraph 101-5 in column 2 where the former is located (i.e., the geometric relationship for adding a main paragraph is not satisfied, e.g., too large character line height or too far from the existing main paragraph), paragraph 105 is not determined as an additional main paragraph in column 2. Thus, the finally obtained main paragraphs (layout paragraphs) include paragraphs 101-1 to 101-5.

According to the method shown in FIG. 2, since layout refining is performed in units of paragraphs by using the coordinate information of each paragraph, neither complex image processing on a character image nor semantic analysis based on a character is needed, the algorithm complexity and the calculation amount are significantly reduced while a certain layout analysis precision is maintained, and the computational load when a computer analyzes the layout problem is alleviated.

Figure 3:
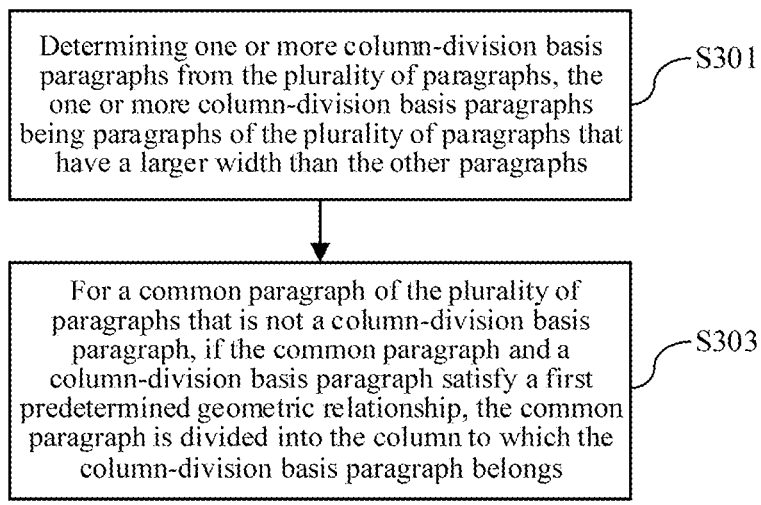
FIG. 3 is a flow chart showing an exemplary method for performing column division on paragraphs in an image according to an exemplary embodiment of the present disclosure.
Figure 4:
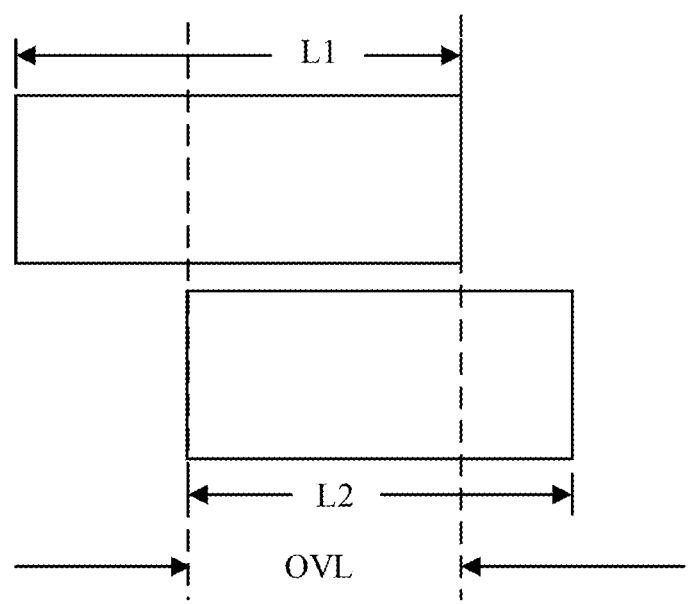
FIG. 4 is a schematic diagram showing the calculation of an overlap rate between two paragraphs in a horizontal direction according to an exemplary embodiment of the present disclosure.
Figure 5:
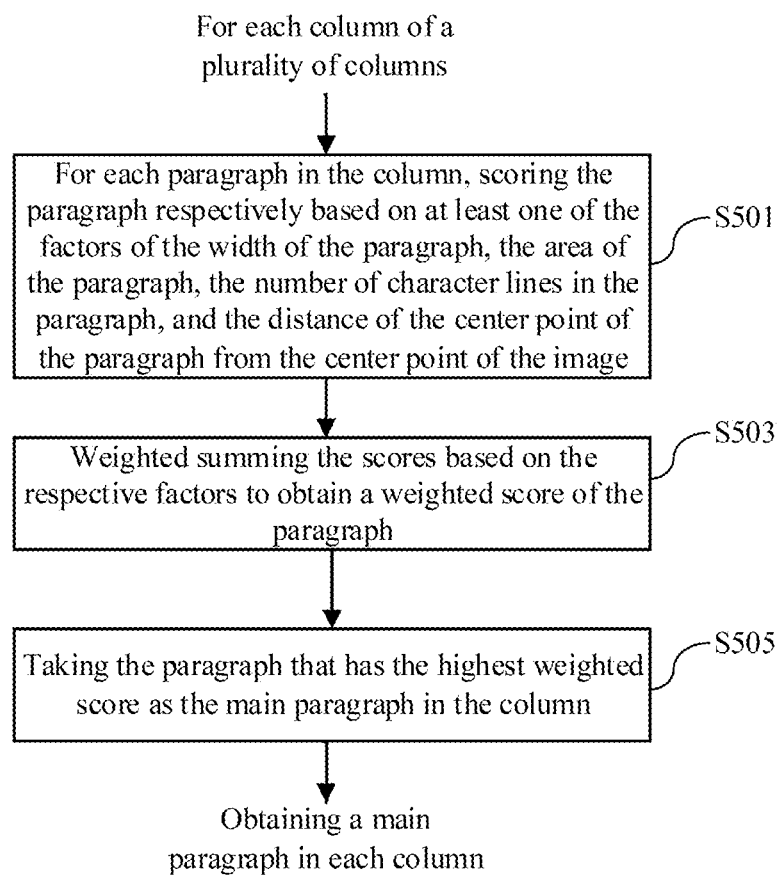
FIG. 5 is a flow chart showing an exemplary method for determining a main paragraph of each column according to an exemplary embodiment of the present disclosure.
Figure 6:
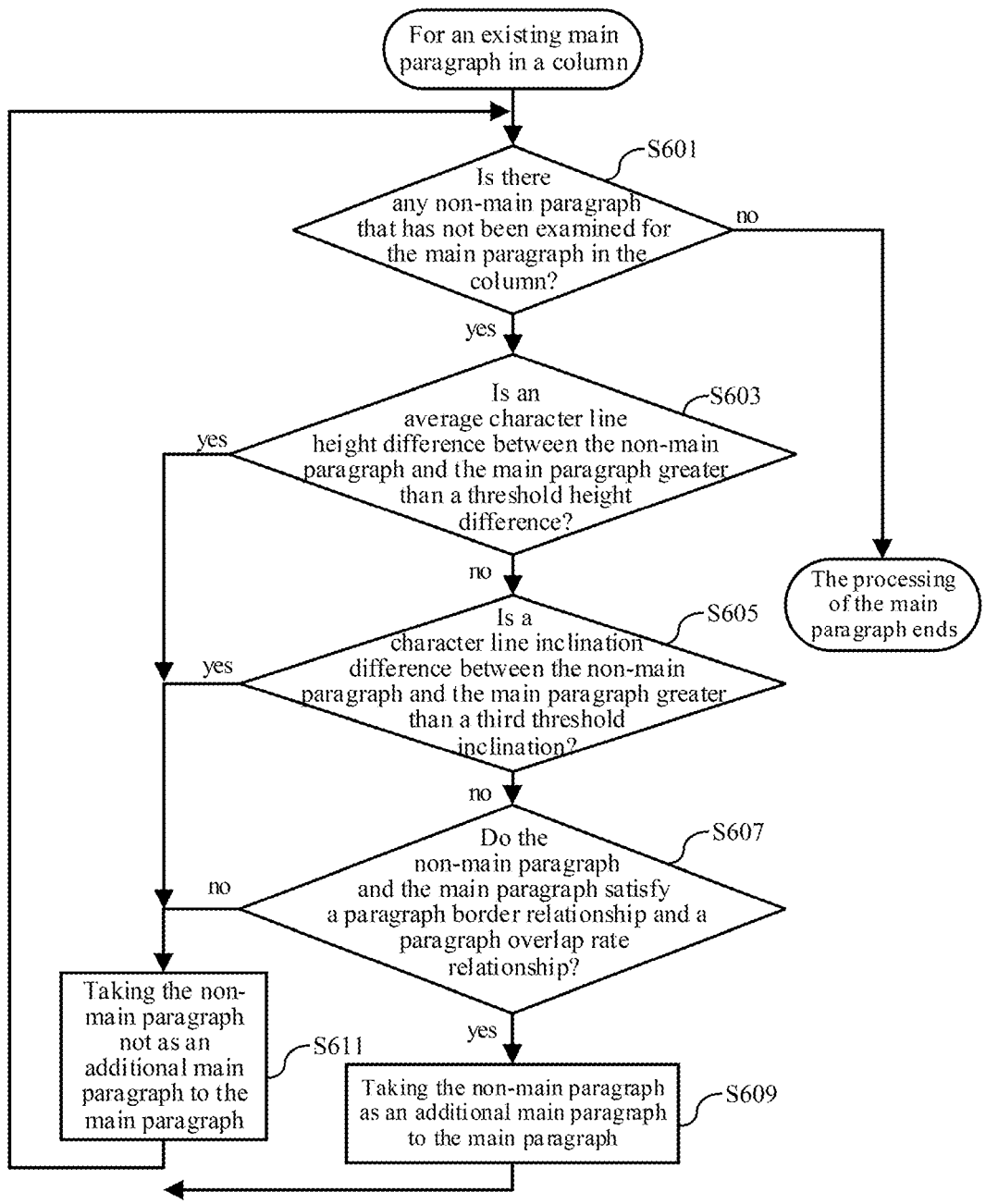
FIG. 6 is a flow chart showing an exemplary method for obtaining an additional main paragraph to the main paragraph by extending the existing main paragraph in each column according to an exemplary embodiment of the present disclosure.
Figure 7A:
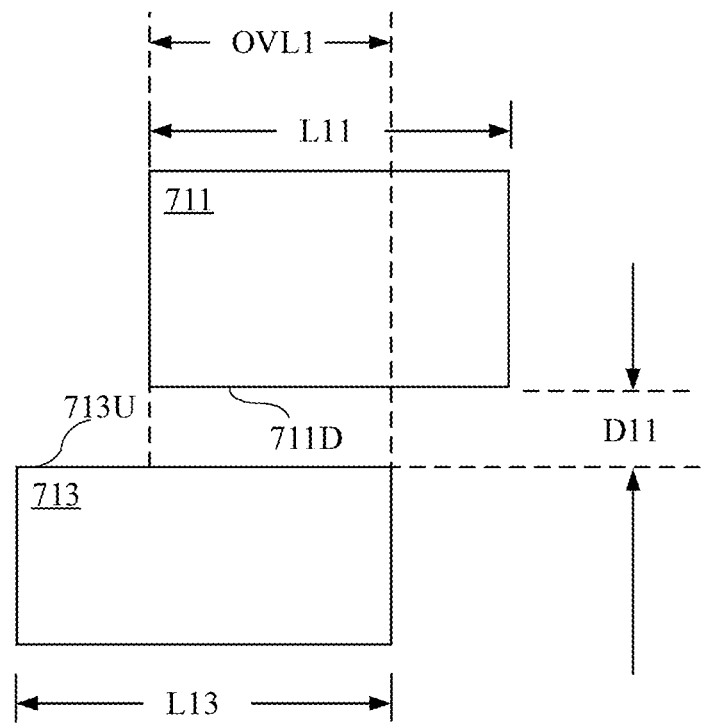
FIGS. 7 (a) and 7 (b) are schematic diagrams showing examples for illustrating the determination of a paragraph border relationship and of an overlap rate relationship according to an exemplary embodiment of the present disclosure.
Figure 7B:
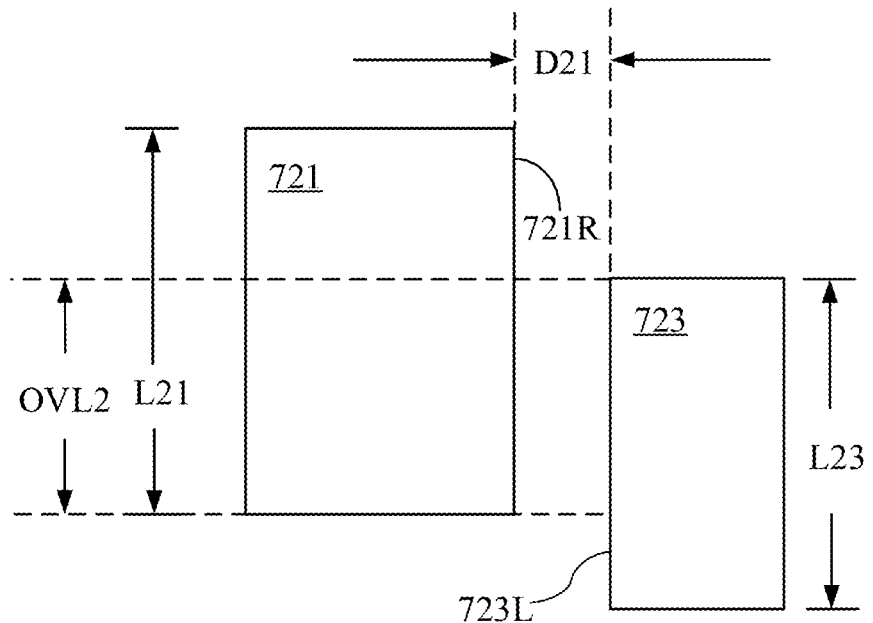
Figure 8:
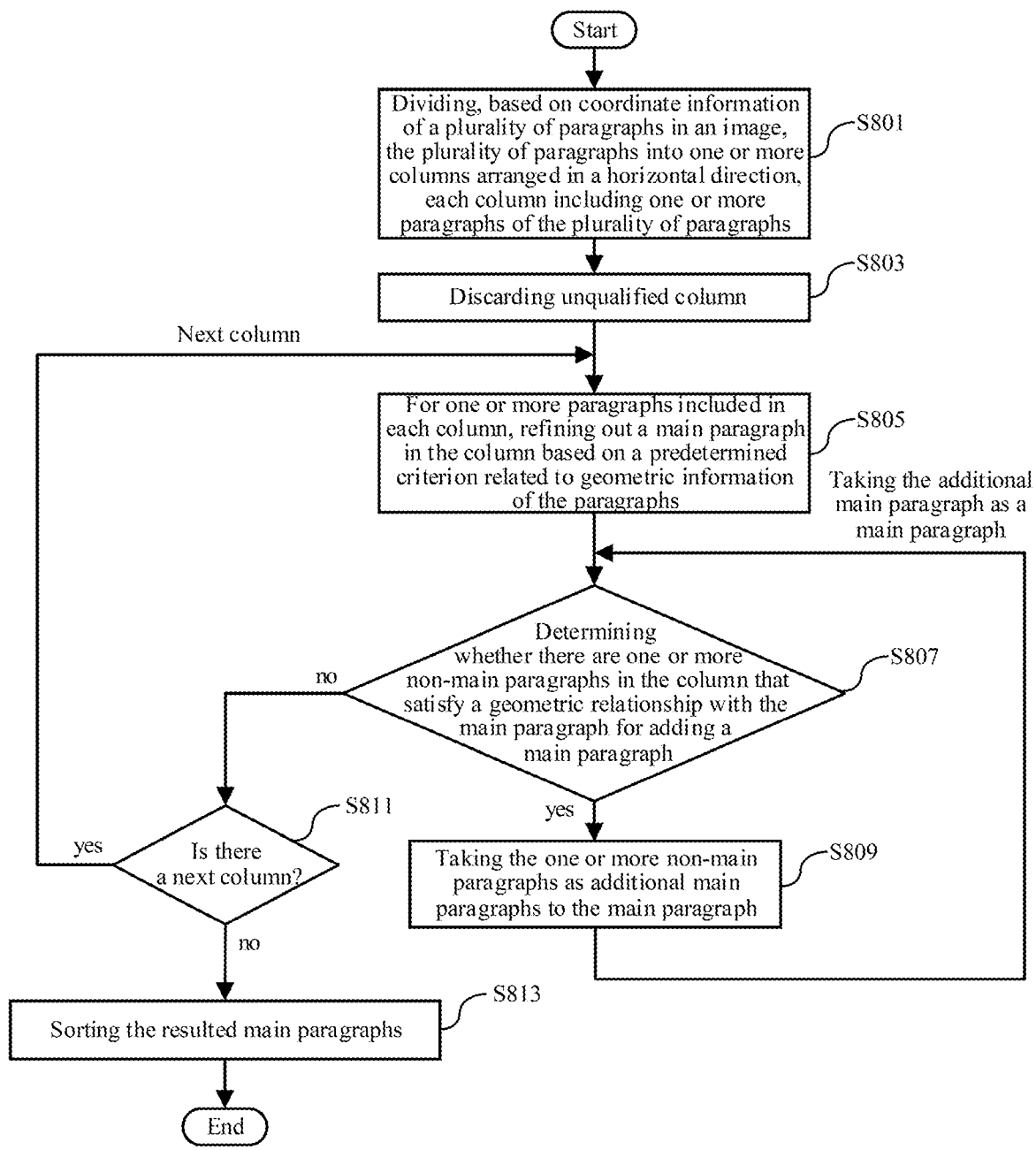
FIG. 8 is a flow chart showing a layout analysis method according to an exemplary embodiment of the present disclosure.

The layout analysis method of the present disclosure has been described above with reference to FIGS. 1 and 2. The exemplary implementations of steps S201, S203 and S205 and other embodiments will be further described in detail below with reference to FIGS. 3 to 9, wherein FIG. 3 shows an exemplary embodiment of the processing of performing column division on paragraphs in an image in step S201, FIG. 5 shows an exemplary embodiment of the processing of determining a main paragraph in each column in step S203, FIG. 6 shows an exemplary embodiment of the processing of obtaining additional main paragraphs to the main paragraph by extending the existing main paragraph in each column in step S205, and FIG. 8 shows an exemplary embodiment of the processing of iteratively determining further additional main paragraphs based on the additional main paragraph. It should be noted that various definitions, embodiments, implementations, examples and the like described above with reference to FIGS. 1 and 2 may also be applied to or combined with the exemplary embodiments described later.

FIG. 3 is a flow chart showing an exemplary method for performing column division on paragraphs in an image according to an exemplary embodiment of the present disclosure, which may be used an exemplary embodiment of step S201, i.e., step S201 may include the steps of the flow chart in FIG. 3.

In step S301, one or more column-division basis paragraphs are determined from the plurality of paragraphs, the one or more column-division basis paragraphs being paragraphs of the plurality of paragraphs that have a larger width than the other paragraphs.

In step S303, for a common paragraph of the plurality of paragraphs that is not a column-division basis paragraph, if the common paragraph and a column-division basis paragraph satisfy a first predetermined geometric relationship, the common paragraph is divided into the column to which the column-division basis paragraph belongs.

In some embodiments, the one or more column-division basis paragraphs having a wider width than the other paragraphs in the image may be, for example, top N large paragraphs obtained by sorting the plurality of paragraphs in the image by width (N is a predetermined positive integer less than the number of paragraphs), or paragraphs having a paragraph width over a first threshold width (the first threshold width may be set to, for example, a fraction of the image width), or paragraphs obtained by refining some paragraphs (e.g., paragraphs having a few character lines, or paragraphs overlapping with other paragraphs having a wider width in the horizontal direction, etc.) out from the paragraphs having a wider width according to a certain condition. Here, "width" means the size in a horizontal direction.

The first predetermined geometric relationship is a criterion for determining which column a common paragraph should be divided into, and may include a relationship criterion between the common paragraph and the one column-division basis paragraph. In some embodiments, the necessary condition for satisfying the first predetermined geometric relationship may include condition a, wherein the condition a comprises: an overlap rate between the common paragraph and the one column-division basis paragraph in the horizontal direction being not less than a first threshold overlap rate (the first threshold overlap rate may be set, for example, to a value between 40% and 70%). According to some embodiments, the condition a may further comprise: the inclination of the common paragraph relative to the one column-division basis paragraph being not greater than a first threshold inclination (the first threshold inclination may be set, for example, to a value between 15 and 35 degrees).

According to some embodiments, the determining one or more column-division basis paragraphs from the plurality of paragraphs in step S301 may include the following steps: taking the paragraph of the plurality of paragraphs that has the largest width as a first column-division basis paragraph; and for an alternative paragraph of the plurality of paragraphs in the image that is different from the first column-division basis paragraph, if the alternative paragraph and the first column-division basis paragraph satisfy a second predetermined geometric relationship, taking the alternative paragraph as a second column-division basis paragraph.

According to some embodiments, the second predetermined geometric relationship on the one hand ensures that the second column-division basis paragraph also has a larger width (e.g., a width comparable to the first column-division basis paragraph), and on the other hand ensures that the second column-division basis paragraph is not a paragraph that should be divided into the same column as the first column-division basis paragraph. According to some embodiments, the necessary condition for satisfying the second predetermined geometric relationship may include, for example, a condition c, wherein the condition c comprises: the ratio of the width of an alternative paragraph to the width of the first column-division basis paragraph being not less than a threshold width ratio (the threshold width ratio may be, for example, a value between 40% and 80%), and an overlap rate between the alternative paragraph and the first column-division basis paragraph in the horizontal direction being not greater than a second threshold overlap rate (the second threshold overlap rate may be, for example, a value between 20% and 50%, and may be equal to the first threshold overlap rate, or less than the first threshold overlap rate). According to the second predetermined geometric relationship, one or more second column-division basis paragraphs that have a large paragraph width and have a size comparable to the first column-division basis paragraph and less overlap therebetween (i.e., which can be considered to belong to different columns) may be determined. According to some embodiments, the condition c may, for example, further comprise: the inclination of the alternative paragraph relative to the first column-division basis paragraph being not greater than a second threshold inclination (the second threshold inclination may be set, for example, to a value between 15 and 35 degrees, and may be equal to the first threshold inclination, or different from the first threshold inclination).

According to some embodiments, if the inclination of an alternative paragraph relative to the first column-division basis paragraph is not greater than a second threshold inclination and the ratio of same to the width of the first column-division basis paragraph is not less than the threshold width ratio in step S301, but an overlap rate between the alternative paragraph and the first column-division basis paragraph in a horizontal direction is greater than the second threshold overlap rate, the alternative paragraph may be divided, in step S303, into the column to which the first column-division basis paragraph belongs. In other words, the necessary condition for satisfying the first predetermined geometric relationship may include either of the conditions a and b, that is, as long as either of the conditions a and b is satisfied, the first predetermined geometric relationship is satisfied. The condition a may be, for example, as described above, and the condition b may, for example, comprise: the ratio of the width of the common paragraph to the width of the first column-division basis paragraph being not less than the threshold width ratio, and an overlap rate between the common paragraph and the first column-division basis paragraph in the horizontal direction being greater than the second threshold overlap rate. According to some embodiments, the condition b may further comprise: the inclination of the common paragraph relative to the first column-division basis paragraph being not greater than the second threshold inclination. The overlap between two paragraphs in a certain direction means that there is a common portion of projections of the two paragraphs on the coordinate axis in the direction.

According to some embodiments, an overlap rate between two paragraphs in a certain direction may be defined as OVR=max (OVL/L1, OVL/L2), where max represents a larger number in the bracket, OVL represents the size of an overlap part between the two paragraphs in the direction, and L1 and L2 respectively represent the size of the two paragraphs in the direction. FIG. 4 is a schematic diagram showing the calculation of an overlap rate between two paragraphs in a horizontal direction according to an exemplary embodiment of the present disclosure. In the example of FIG. 4, OVL=12, L1=20, and L2=17, and therefore, the overlap rate between the two paragraphs in the horizontal direction is OVR=max (OVL/L1, OVL/L2)=12/17. Although the concept and calculation method for the overlap rate are given here, it should be appreciated that the concept and calculation method for the overlap rate are not limited thereto as long as they can express the overlap state of two paragraphs in a certain direction.

In some cases, a common paragraph and a plurality of column-division basis paragraphs may satisfy the first predetermined geometric relationship, then it may be determined, in any way, the common paragraph is divided into which column to which the column-division basis paragraph belongs. For example, the common paragraph may be randomly divided into the column to which any column-division basis paragraph belongs that satisfies the first predetermined geometric relationship with the common paragraph; or the common paragraph is divided into the column to which a column-division basis paragraph having a large paragraph width belongs; or the inclinations and overlap rates between the common paragraph and the plurality of column-division basis paragraphs are scored (the greater the inclination, the lower the score, and the greater the overlap rate, the higher the score), and the common paragraph is divided into the column to which a column-division basis paragraph having a higher score belongs.

By means of the method illustrated in the flow chart of FIG. 3, one or more column-division basis paragraphs may be determined, and each of the paragraphs is divided into the column to which the corresponding column-division basis paragraph belongs, so as to complete the column division processing of the plurality of paragraphs.

FIG. 5 is a flow chart showing an exemplary method for determining a main paragraph in each column according to an exemplary embodiment of the present disclosure, which may be used as an exemplary embodiment of step S203, i.e., step S203 may include the steps of the flow chart in FIG. 5. As mentioned above, determining a main paragraph in a column is determining a paragraph that may be a layout paragraph rather than a background paragraph. The flow chart in FIG. 5 gives an exemplary method for determining an initial main paragraph in a column.

According to the exemplary embodiment shown in FIG. 5, determining a main paragraph in the column based on a predetermined criterion related to the geometric information of the paragraphs in step S203 may include the following steps:

step S501, for each paragraph in the column, scoring the paragraph respectively based on at least one of the factors of the width of the paragraph, the area of the paragraph, the number of character lines in the paragraph, and the distance of the center point of the paragraph from the center point of the image;

step S503, weighted summing the scores based on the respective factors to obtain a weighted score of the paragraph; and step S505, taking the paragraph that has the highest weighted score as the main paragraph in the column.

The scoring method is determined on the basis how each factor affects whether a paragraph may be a paragraph in the layout. For example, the greater the width of a paragraph, the higher the score of the paragraph width; the greater the area of a paragraph, the higher the score of the paragraph area; the greater the number of character lines in a paragraph, the higher the score of the number of character lines in the paragraph; the closer the distance of the center point of the paragraph from the center point of the image, the higher the score of the distance in the paragraph.

Each score may be an actual measure of each factor, or a multiple of the actual measure of each factor relative to a reference value of the factor. For example, the score of the paragraph width may be the actual paragraph width divided by a paragraph width reference value (e.g., the image width, or the width of the widest paragraph in the image, etc.), the score of the paragraph area may be the actual paragraph area divided by a paragraph area reference value (e.g., the area of the image, or the area of the paragraph with the largest area in the image, etc.), the score of the number of character lines in the paragraph may be the actual number of character lines divided by a character line number reference value (e.g., the number of character lines in the paragraph with the largest number of character lines in the image, etc.), and the score of the distance of the center point of the paragraph from the center point of the image may be an inverse or reciprocal of the actual distance divided by a distance reference value (e.g., the length of one side of the image, etc.).

The weight for weighting may be determined according to the extent of each factor in the specific application contributes to whether the paragraph may be a layout paragraph. When each score is an actual measure of each factor, the weight has a corresponding dimension, and when each score is a multiple of the actual measure of each factor relative to the factor reference value, the weight has no dimension. It should be noted that, according to some embodiments, the weighting may have been embodied in the factor reference value used in scoring in S501, and thus the weight in S503 is 1. Embodiments in which the weights are not specifically set (i.e., the weight is 1) and are added are also included within the scope of "weighted summing" in the present disclosure, that is, considering that weighted summing is performed with the weight of 1.

FIG. 6 is a flow chart showing an exemplary method for obtaining an additional main paragraph to the main paragraph by extending the existing main paragraph in each column according to an exemplary embodiment of the present disclosure. Although the processing in the flow chart in FIG. 6 is performed for an existing main paragraph in one column, the processing may be performed for all the main paragraphs in all the columns. The existing main paragraph herein may be the initially determined main paragraph (which may, for example, be determined according to the exemplary step in the flow chart of FIG. 5), or may be an additional main paragraph (i.e., further adding a main paragraph based on an additional main paragraph).

According to the processing in the flow chart of FIG. 6, for the existing main paragraph in the column, it is determined, based on a geometric relationship (i.e., a geometric relationship for adding a main paragraph) between the main paragraph and non-main paragraphs, whether all the non-main paragraphs can be obtained as additional main paragraphs by extending the main paragraph. If the geometric relationship indicates that there is a high correlation (e.g., close distance, similar feature of character lines, good alignment, etc.) between the main paragraph and a non-main paragraph, the non-main paragraph is added as an additional main paragraph based on the main paragraph.

According to the exemplary embodiment in the flow chart of FIG. 6, the average character line height relationship and the character line inclination relationship are determined first, and then the paragraph border relationship and the paragraph overlap rate relationship are determined. However, it should be appreciated that the order of steps in the flow chart is only an exemplary embodiment, and the technical solution of the present disclosure is not limited thereto. As mentioned above, these conditions may be combined and applied in various ways according to application needs, all of or only a part of these conditions may be employed, and the order of application is not limited to a specific order. For example, the paragraph border relationship may be determined first, and then whether the other geometric relationships meet the requirement for adding a main paragraph is determined only when the paragraph border relationship is satisfied. For example, the determination on the condition for the average character line height difference may be also omitted. The application method and application order of the geometric relationships in determining whether the requirement for adding a main paragraph is met are not limited to a particular application method and application order.

In step S601, for the existing main paragraph in the column, it is determined whether there is any non-main paragraph that has not been examined. If all non-main paragraphs have been examined for the main paragraph ("NO" in step S601), the processing of the existing main paragraph ends. If there is still a non-main paragraph that has not been examined for the main paragraph ("YES" in step S601), the process proceeds to step S603 to process the non-main paragraph that has not been examined.

In step S603, it is determined whether the difference between an average character line height of the non-main paragraph and an average character line height of the main paragraph (i.e., an average character line height difference) is greater than a threshold height difference. If the average character line height difference is greater than the threshold height difference ("YES" in step S603), the non-main paragraph is not determined as an additional main paragraph to the main paragraph (step S611). If the average character line height difference is not greater than the threshold height difference ("NO" in step S603), continuing to determine the other conditions in the geometric relationship for adding a main paragraph (step S605).

According to step S603, if the average character line height of the non-main paragraph is significantly different from the average character line height of the main paragraph, the non-main paragraph and the main paragraph may be considered to be not highly correlated with each other, that is, they are unlikely to belong to the same layout. Conversely, it is not excluded that the non-main paragraph may be used as an additional main paragraph, that is, continuing to determine the other conditions in the geometric relationship for adding a main paragraph.

Here, a threshold height difference may be an absolute character line height value, or a ratio, for example, a fraction or a multiple of a character line height value of one character line (for example, a character line having a smaller character line height value). For example, the threshold height difference may be set to a value of 3 to 10 pixels, or set to, for example, ½ of a smaller character line height in comparison, etc.

According to some embodiments, for a main paragraph, if a non-main paragraph is determined not to be an additional main paragraph to the main paragraph, the non-main paragraph will be still examined as a non-main paragraph for another main paragraph. Conversely, for a main paragraph, if a non-main paragraph is determined to be an additional main paragraph to the main paragraph, the paragraph that has become the additional main paragraph is no longer considered as a non-main paragraph for another main paragraph.

In step S605, it is determined whether a difference between a character line inclination of the non-main paragraph and a character line inclination of the main paragraph (i.e., a character line inclination difference) is greater than a third threshold inclination. If the character line inclination difference is greater than the third threshold inclination ("YES" in step S605), the non-main paragraph is not taken as an additional main paragraph to the main paragraph (step S611). If the character line inclination difference is not greater than the third threshold inclination ("NO" in step S605), continuing to determine the other conditions in the geometric relationship for adding a main paragraph (step S607).

According to this step, if the character line inclination of the non-main paragraph is significantly different from the character line inclination of the main paragraph, the non-main paragraph and the main paragraph may be considered to be not highly correlated with each other, that is, they are unlikely to belong to the same layout. Conversely, it is not excluded that the non-main paragraph may be taken as an additional main paragraph, that is, continuing to determine the other conditions in the geometric relationship for adding a main paragraph.

Here, the third threshold inclination may be the same as or different from at least one of the first threshold inclination and the second threshold inclination. According to some embodiments, the third threshold inclination may be set, for example, to a value between 15 and 35 degrees according to a specific application requirement.

In step S607, it is determined whether the non-main paragraph and the main paragraph satisfy a paragraph border relationship and an overlap rate therebetween is not less than a third threshold overlap rate. If the non-main paragraph satisfies the paragraph border relationship with the main paragraph and the overlap rate therebetween is not less than the third threshold overlap rate ("YES" in step S607), the non-main paragraph is used as an additional main paragraph based on the main paragraph (step S609). If the non-main paragraph does not satisfy the paragraph border relationship with the main paragraph and the overlap rate therebetween is less than the third threshold overlap rate ("NO" in step S607), the non-main paragraph is not used as an additional main paragraph based on the main paragraph (step S611).

The third threshold overlap rate may be, for example, the same as or different from the first threshold overlap rate. According to some embodiments, the third threshold overlap rate may be set, for example, to a value between 40% and 70%.

The paragraph border relationship embodies a positional relationship between paragraphs, which may include, for example, an upper, lower, left, or right positional relationship and/or a distance therebetween. The combination of the paragraph border relationship and the overlap rate relationship may embody whether the two paragraphs are closely correlated. For example, if the distance between the nearest paragraph borders of the non-main paragraph and the main paragraph is relatively far or an overlap rate therebetween is relatively low, the non-main paragraph and the main paragraph may be considered to be not highly correlated with each other, that is, they are unlikely to belong to the same layout. Conversely, the non-main paragraph and the main paragraph may be considered to be highly correlated with each other in combination with the previous condition determination result, that is, they belong to the same layout.

After the execution of the processing in steps S609 and S611, the examination on a current non-main paragraph is completed, and the process returns to step S601 to determine whether there is still any non-main paragraph that has not been examined for the current main paragraph.

The exemplary processing for executing step S607 is further described below.

In the exemplary processing for executing step S607, it is determined whether the non-main paragraph satisfy the paragraph border relationship with the main paragraph.

Particularly, the paragraph border relationship may include a basic relative positional relationship between a non-main paragraph and a main paragraph and a corresponding paragraph border distance relationship thereof. The basic relative positional relationship means that the non-main paragraph is above, below, on the left of or on the right of the main paragraph. A paragraph border distance may be a distance between the closest parallel borders of two paragraphs, and in the case where the paragraph border distance is not greater than a threshold distance, the non-main paragraph and the main paragraph are considered to satisfy the paragraph border relationship. The threshold distance may be set according to specific application requirements, for example, set to a value between 1.5 and 4 times the average character line height. According to an embodiment, the non-main paragraph and the main paragraph are considered to satisfy the paragraph border relationship if at least one of the following conditions is satisfied:

the non-main paragraph is above the main paragraph (for example, but not limited to, an upper border of the non-main paragraph is higher than that of the main paragraph), and the distance between a lower border of the non-main paragraph and the upper border of the main paragraph is not greater than a threshold distance, or the lower border of the non-main paragraph is lower than the upper border of the main paragraph;

the non-main paragraph is below the main paragraph (for example, but not limited to, a lower border of the non-main paragraph is lower than that of the main paragraph), and the distance between the upper border of the non-main paragraph and the lower border of the main paragraph is not greater than a threshold distance, or the upper border of the non-main paragraph is higher than the lower border of the main paragraph;

the non-main paragraph is on the left of the main paragraph (for example, but not limited to, a left border of the non-main paragraph is on the left of a left border of the main paragraph), and the distance between a right border of the non-main paragraph and the left border of the main paragraph is not greater than a threshold distance, or the right border of the non-main paragraph is on the right of the left border of the main paragraph; and the non-main paragraph is on the right of the main paragraph (for example, but not limited to, the right border of the non-main paragraph is on the right of a right border of the main paragraph), and the distance between the left border of the non-main paragraph and the right border of the main paragraph is not greater than a threshold distance, or the left border of the non-main paragraph is on the left of the right border of the main paragraph.

In the exemplary processing for executing step S607, it is also necessary to determine whether the non-main paragraph and the main paragraph satisfy a paragraph overlap rate relationship.

The definition of the overlap rate may be the same as that described above, for example, the definition of an overlap rate between two paragraphs in a certain direction as described in conjunction with FIG. 4 may be employed. According to an embodiment, the non-main paragraph and the main paragraph are considered to satisfy the overlap rate relationship if at least one of the following conditions is satisfied:

the non-main paragraph is above or below the main paragraph, and the overlap rate between the non-main paragraph and the main paragraph in the horizontal direction is not less than the third threshold overlap rate; and the non-main paragraph is on the left or right of the main paragraph, and an overlap rate between the non-main paragraph and the main paragraph in the vertical direction is not less than the third threshold overlap rate.

The exemplary processing for executing step S607 is illustrated below in conjunction with the schematic diagrams of FIGS. 7 (a) and 7 (b). FIGS. 7 (a) and 7 (b) are schematic diagrams showing examples for illustrating the determination of a paragraph border relationship and an overlap rate relationship according to an exemplary embodiment of the present disclosure, wherein FIG. 7 (a) shows a non-main paragraph 711 and a main paragraph 713 that are in an upper-lower relationship, and FIG. 7 (b) shows a non-main paragraph 721 and a main paragraph 723 that are in a left-right relationship.

In the schematic diagram shown in FIG. 7 (a), the non-main paragraph 711 is above the main paragraph 713, a distance D11 between a lower border 711D of the non-main paragraph 711 and an upper border 713U of the main paragraph 713 is not greater than a threshold distance (e.g., set to a height of 3 character lines), and an overlap rate OVR1=max (OVL1/L11, OVL1/L13) between the non-main paragraph 711 and the main paragraph 713 in a horizontal direction is not less than a third threshold overlap rate (e.g., set to 50%), where OVL1 is the size of an overlap part between the non-main paragraph 711 and the main paragraph 713 in a horizontal direction, and L11 and L13 are respectively the size of the non-main paragraph 711 and the main paragraph 713 in a horizontal direction. Thus, it may be determined that the non-main paragraph 711 and the main paragraph 713 satisfy the paragraph border relationship and the overlap rate relationship (i.e., the overlap rate therebetween is not less than the third threshold overlap rate). If the average line height difference and character line inclination difference between the non-main paragraph and the main paragraph are combined, the non-main paragraph may be used as an additional main paragraph to the main paragraph.

In the schematic diagram shown in FIG. 7 (b), the non-main paragraph 721 is on the left of the main paragraph 723, a distance D21 between a right border 721R of the non-main paragraph 721 and a left border 723L of the main paragraph 723 is not greater than a threshold distance (e.g., set to a height of 3 character lines, or a height of 3 characters, etc.), and an overlap rate OVR2=max (OVL2/L21, OVL2/L23) between the non-main paragraph 721 and the main paragraph 723 in a vertical direction is not less than a third threshold overlap rate (e.g., set to 50%), where OVL2 is the size of an overlap part between the non-main paragraph 721 and the main paragraph 723 in the vertical direction, and L21 and L23 are respectively the size of the non-main paragraph 721 and the main paragraph 723 in the vertical direction. Thus, it may be determined that the non-main paragraph 721 and the main paragraph 723 satisfy the paragraph border relationship and the overlap rate relationship (i.e., the overlap rate therebetween is not less than the third threshold overlap rate). If the average line height difference and character line inclination difference between the non-main paragraph and the main paragraph are considered in combination, the non-main paragraph may be taken as an additional main paragraph to the main paragraph.

Various steps and embodiments of the exemplary implementations of the present disclosure have been described with reference to FIGS. 1 to 7 (a) and 7 (b). The exemplary method therein may include: performing column division on paragraphs, determining, for each of at least some of a plurality of columns, a main paragraph in the column, and determining additional main paragraphs for each column based on the existing main paragraph. The obtained main paragraphs (including the additional main paragraph) are considered to be paragraphs that are more likely to be layout paragraphs.

According to some embodiments, for the additional main paragraphs, the processing in step S205 or the processing in the flow chart of FIG. 6 may also be repeated, such that a further additional main paragraph can be iteratively determined from the existing main paragraphs (including the additional main paragraph). In other words, after the additional main paragraph is obtained, the non-main paragraphs in the column that satisfy the geometric relationship for adding a main paragraph are selected as further additional main paragraphs based on the additional main paragraph, and the step is repeated until there are no more non-main paragraphs in the column that satisfy the geometric relationship for adding a main paragraph (i.e., until additional main paragraph cannot be obtained by extending the current main paragraphs (including the additional main paragraph)), and the finally obtained main paragraphs (including the additional main paragraph) are taken as paragraphs that are more likely layout paragraphs. Moreover, according to some embodiments, the method of the present disclosure may further include some additional steps.

FIG. 8 is a flow chart showing a layout analysis method according to an exemplary embodiment of the present disclosure.

In step S801, based on coordinate information of a plurality of paragraphs in an image, the plurality of paragraphs are divided into one or more columns arranged in a horizontal direction, each of the columns including one or more paragraphs of the plurality of paragraphs. Step S801 may be implemented by the processing similar to the processing in step S201 (for example, the processing in the flow chart of FIG. 3).

In step S803, after the plurality of paragraphs are divided into one or more columns arranged in the horizontal direction in step S801, unqualified columns are discarded to obtain at least some of the one or more columns. The unqualified columns are columns that are considered to be unlikely in the layout due to their features. The unqualified column may be, for example, but not limited to, at least one of the following: a column having a width less than a second threshold width (the second threshold width may be set, for example, but not limited to, a value between ⅕ and ⅓ of an image width), a column having a number of character lines less than a threshold character line number (the threshold character line number may be set, for example, but not limited to, a value between 1 and 3 lines), a column having a column area less than a threshold column area (the threshold column area may be set, for example, but not limited to, a value between ⅛ and ⅓ of an image area), a column having a character line inclination greater than a fourth threshold inclination (the fourth threshold inclination may be greater than the first, second, and third threshold inclinations, and may be set to, for example, but not limited to, a value between 25 and 45 degrees), etc. By discarding the unqualified columns, the columns that are obviously not in a reading material layout can be filtered out on the level of columns, thereby improving the accuracy of layout analysis and also reducing the calculation amount of subsequent processing.

In step S805, for one or more paragraphs included in each of at least some (the columns remaining after the unqualified columns are discarded in step S803) of the one or more columns, a main paragraph (an initially determined main paragraph) in the column is determined based on a predetermined criterion related to geometric information of the paragraphs. Step S805 may be implemented by the processing similar to the processing in step S203 (for example, the processing in the flow chart of FIG. 5).

In step S807, it is determined whether there are one or more non-main paragraphs in the column that satisfy a geometric relationship with the main paragraph for adding a main paragraph. Step S807 may be implemented by the processing similar to the processing in step S205 (for example, the processing in the flow chart of FIG. 6).

If it is determined, in step S807, that there are one or more non-main paragraphs in the column that satisfy a geometric relationship with the main paragraph for adding a main paragraph ("YES" in step S807), the one or more non-main paragraphs are used as additional main paragraphs to the main paragraph in step S809 and the additional main paragraphs are used as main paragraphs, and steps S807 and S809 are iteratively repeated until it is determined, in step S807, that there is no one or more non-main paragraphs in the column that satisfies the geometric relationship with the main paragraph for adding a main paragraph. If it is determined in step S807 that there are no non-main paragraphs in the column that satisfy the geometric relationship for adding a main paragraph with any main paragraph ("NO" in step S807), the remaining non-main paragraphs are not taken as additional main paragraphs to the main paragraph, the processing on this column ends, and it is determined whether there is a next unprocessed column (step S811). The remaining non-main paragraphs may be taken as paragraphs that are not layout paragraphs (i.e., background paragraphs) due to large feature differences with any main paragraphs.

In step S811, if there is a next unprocessed column ("YES" in step 811), the processing in steps S805 to S811 is performed on the next column until all the columns are processed. If there is no next unprocessed column ("NO" in step 811), it is considered that all the columns have been processed, the finally obtained main paragraphs (including any additional main paragraphs) are considered as layout paragraphs of the reading material, and all the finally obtained main paragraphs (including any additional main paragraphs) in the image may be sorted in step S813. The sorting may, for example, include sorting all the main paragraphs in a normal reading order from top to bottom and left to right.

Figure 9:
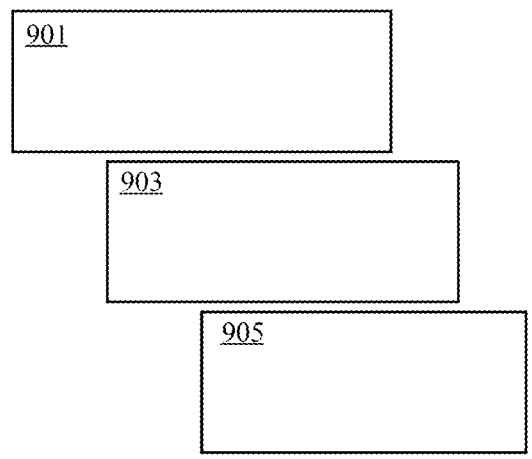
FIG. 9 is a schematic diagram showing a layout analysis example for illustrating the method according to an exemplary embodiment of the present disclosure.

FIG. 9 is a schematic diagram showing a layout analysis example for illustrating the method according to an exemplary embodiment of the present disclosure, wherein an example of layout analysis performed by iterating steps S807 and S809 is illustrated.

In the example shown in FIG. 9, paragraph 901 is a main paragraph. After the processing in step S205 (or the processing in the flow chart of FIG. 6, or the processing in step S807), paragraph 903 is determined as an additional main paragraph based on the paragraph 901; and after the processing in step S205 (or the processing in the flow chart of FIG. 6, or the processing in step S807), paragraph 905 is further determined as an additional main paragraph based on the paragraph 903.

Further additional main paragraphs may be determined not only based on the initial main paragraph but also the additional main paragraphs by means of the iteration processing, so that the paragraphs that should be taken as main paragraphs (layout paragraphs) can be well recognized even if there is a gradual change in such factors as the paragraph overlap rate, character line inclination, paragraph border distance, character line height due to the shooting angle, the page deformation of reading materials and the like.

According to at least some exemplary embodiments of the present disclosure described above in conjunction with FIGS. 1 to 9, rough column division and determination on main paragraphs in a column are performed first, and then additional main paragraphs are determined based on the main paragraphs, so that it can be determined that the paragraphs in the column are unlikely layout paragraphs. Such a step-by-step layout analysis can better balance the calculation amount and the analysis accuracy.

The exemplary method for layout analysis according to the present disclosure has been described above with reference to the accompanying drawings. After the layout analysis, subsequent processing may also be performed. For example, the character data recognized in each main-paragraph may be converted into sound data in combination with a character recognition result according to paragraph refining and sorting results, which may be used, for example, in applications related to audio reading materials and visual impaired assisting applications.

Figure 10:
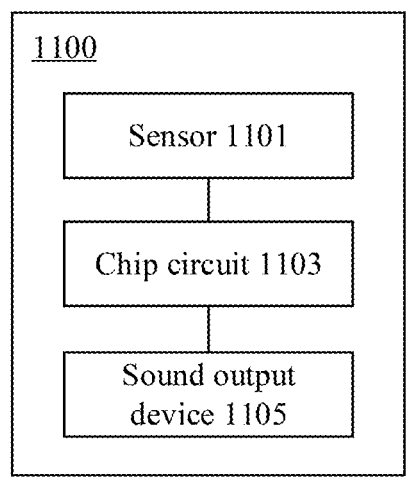
FIG. 10 is a structural block diagram showing a reading assisting device according to an exemplary embodiment of the present disclosure.

An aspect of the present disclosure may include a reading assisting device. FIG. 10 is a structural block diagram showing a reading assisting device according to an exemplary embodiment of the present disclosure. As shown in FIG. 10, the reading assisting device 1100 includes: a sensor 1101 (which may be, for example, implemented as a camera and a photographing device) configured to acquire the aforementioned image (the image may be, for example, a static image or a video image, and the image may include character): and a chip circuit 1103, the chip circuit including a circuit configured to execute the steps of any of methods above. The chip circuit may further include a circuit configured to perform character recognition on the image to obtain character data, and a circuit configured to convert the character data in a main paragraph into sound data according to a layout analysis result. The circuit configured to perform character recognition on the image to obtain character data may, for example, use any character recognition (e.g., optical character recognition (OCR)) software or circuit. The circuit configured to convert the character data in each paragraph into sound data according to a paragraph division result may, for example, use any character-to-speech conversion software or circuit. The circuits may be implemented, for example, by an ASIC chip or an FPGA chip. The reading assisting device 1100 may further include a sound output device 1105 (e.g., a speaker, a headphone, etc.) configured to output the sound data (i.e., speech data).

An aspect of the present disclosure may include an electronic device. The electronic device may include: a processor; and a memory for storing a program, the program including instructions that, when executed by the processor, cause the processor to execute any of the methods. According to some embodiments, the program may further include an instruction to convert, when the instruction is executed by the processor, the character data in a main paragraph into sound data according to a layout analysis result. According to some embodiments, the electronic device may be, for example, a reading assisting device. According to some embodiments, the electronic device may be another device (e.g., a mobile phone, a computer, a server, etc.) in communication with the reading assisting device. In the case where the electronic device is another device in communication with the reading assisting device, the reading assisting device may send the photographed image to the another device for execution of any of the methods by the another device, and then returns a processing result (e.g., a layout analysis result, a character recognition result, and/or sound data converted from the character data, etc.) of the method back to the reading assisting device for execution of the subsequent processing (e.g., playing the sound data to a user) by the reading assisting device.

According to some embodiments, the reading assisting device may be implemented as a wearable device, for example, a device worn in the form of eyeglasses, a head-mounted device (such as a helmet or a hat), a device wearable on ears, accessories attached to eyeglasses (e.g., an eyeglass frame, eyeglass legs, etc.), accessories attached to the hat, etc.

By means of the reading assisting device, a visual impaired user is able to "read," as a normal vision reader, conventional reading materials (e.g., books, magazines, etc.) using a similar reading posture. During the course of "reading," the reading assisting device may perform character recognition and paragraph division, then automatically filter the paragraphs according to the methods in the embodiments above to obtain main paragraphs (layout paragraphs), convert the character in the main paragraphs into sound in an order of the main paragraphs after paragraph filtration, and output the sound through an output apparatus such as a speaker or a headphone, for the user to listen.

An aspect of the present disclosure may include a non-transitory computer readable storage medium storing a program, the program including instructions that, when executed by a processor of an electronic device, cause the electronic device to execute any of the methods.

Figure 11:
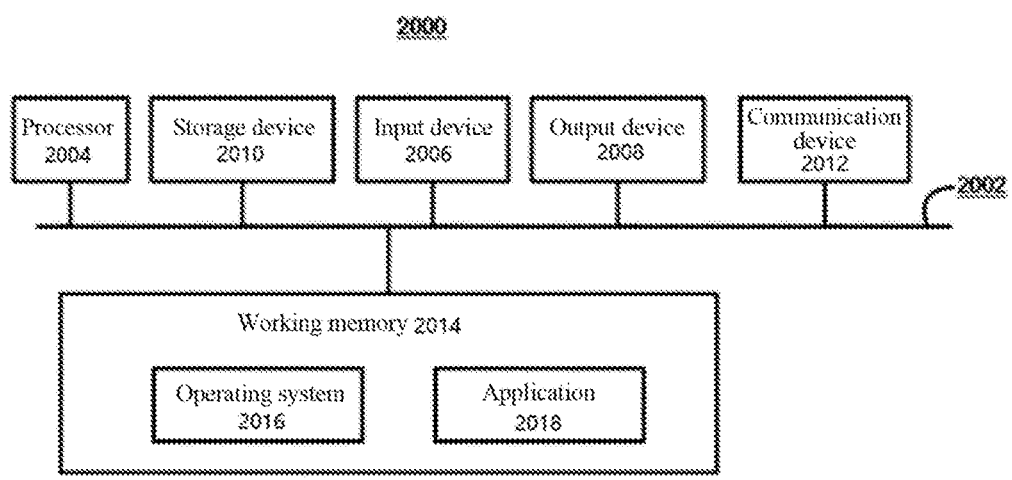
FIG. 11 is a structural block diagram showing an exemplary computing device that can be applied to the exemplary embodiments.

Referring to FIG. 11, a computing device 2000 is now described, which is an example of a hardware device that can be applied to various aspects of the present disclosure. The computing device 2000 may be any machine configured to perform processing and/or computing, which may be, but is not limited to, a workstation, a server, a desktop computer, a laptop computer, a tablet computer, a personal digital assistant, a smart phone, an on-board computer, a wearable device or any combination thereof. According to some embodiments, the reading assisting device or the electronic device may also be implemented, in whole or at least in part, by the computing device 2000 or a similar device or system.

The computing device 2000 may include elements in connection with a bus 2002 or in communication with a bus 2002 (possibly via one or more interfaces). For example, the computing device 2000 may include the bus 2002, one or more processors 2004 (which may be used to implement the processor or chip circuit included in the reading assisting device), one or more input devices 2006, and one or more output devices 2008. The one or more processors 2004 may be any type of processors, and may include, but are not limited to, one or more general-purpose processors and/or one or more dedicated processors (e.g., special processing chips). The input device 2006 may be any type of device capable of inputting information to the computing device 2000, and may include, but is not limited to, a sensor (e.g., the sensor for acquiring an image as described above), a mouse, a keyboard, a touch screen, a microphone and/or a remote controller. The output device 2008 may be any type of device capable of presenting information, and may include, but is not limited to, a display, a speaker (e.g., the output device that may be used to output the sound data as described above), a video/audio output terminal, a vibrator and/or a printer. The computing device 2000 may also include a non-transitory storage device 2010 or be connected to a non-transitory storage device 2010. The non-transitory storage device (which may be, for example, used for implementing the non-transitory computer readable storage medium as described above) may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other non-transitory medium from which a computer can read data, instructions and/or codes. The non-transitory storage device 2010 may be detached from an interface. The non-transitory storage device 2010 may have data/programs (including instructions)/codes for implementing the methods and steps. The computing device 2000 may also include a communication device 2012. The communication device 2012 may be any type of device or system that enables communication with an external device and/or a network, and may include, but is not limited to, a modem, a network card, an infrared communication device, a wireless communication device and/or a chipset, e.g., a Bluetooth device, a 1302.11 device, a WiFi device, a WiMax device, a cellular communication device and/or the like.

The computing device 2000 may also include a working memory 2014 (which may be used to implement the memory included in the reading assisting device), which may be any type of working memory capable of storing programs (including instructions) and/or data useful to the working of the processor 2004, and may include, but is not limited to, a random access memory and/or a read-only memory.

Software elements (programs) may be located in the working memory 2014, and may include, but is not limited to, an operating system 2016, one or more applications 2018, drivers, and/or other data and codes. The instructions for executing the methods and steps may be included in the one or more applications 2018. Executable codes or source codes of the instructions of the software elements (programs) may be stored in a non-transitory computer readable storage medium (e.g., the storage device 2010), and may be stored in the working memory 2014 when executed (may be compiled and/or installed). The executable codes or source codes of the instructions of the software elements (programs) may also be downloaded from a remote location.

When the computing device 2000 shown in FIG. 11 is applied to an embodiment of the present disclosure, the memory 2014 may store program codes for executing the flow chart of the present disclosure and/or an image to be recognized containing character content. The applications 2018 may include optical character recognition applications (such as Adobe), voice conversion applications, editable character processing applications, etc., that are provided by a third party. The input device 2006 may be a sensor for acquiring an image including character content. The stored image including character content or the acquired image may be processed by the OCR application into an output result including character, and a paragraph division result is obtained by a character processing application. The output device 2008 is, for example, a speaker or a headphone for speech broadcast. The processor 2004 is configured to execute, according to the program codes in the memory 2014, the steps of the methods according to various aspects of the present disclosure.

It should also be appreciated that various variations may be made according to specific requirements. For example, custom hardware may also be used, and/or specific elements (i.e., the chip circuits) may be implemented in hardware, software, firmware, middleware, microcodes, hardware description languages, or any combination thereof. For example, some or all of the disclosed methods and devices (e.g., the circuit units in the chip circuit) may be implemented by programming hardware (e.g., a programmable logic circuit including a field programmable gate array (FPGA) and/or a programmable logic array (PLA)) in an assembly language or a hardware programming language (such as, VERILOG, VHDL, C++) by using the logic and algorithm in consistent with the present disclosure.

It should also be appreciated that the components of the computing device 2000 may be distributed over a network. For example, some processing may be executed by one processor while other processing may be executed by another processor away from the one processor. Other components of the computing system 2000 may also be similarly distributed. In this way, the computing device 2000 may be interpreted as a distributed computing system that performs processing at multiple positions.

Although the embodiments or examples of the present disclosure have been described with reference to the accompanying drawings, it should be appreciated that the methods, systems and devices described above are merely exemplary embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented layout analysis method, comprising the following steps:
   executed by a processor:
   grouping, based on coordinate information of a plurality of paragraphs in an image, the plurality of paragraphs into one or more columns arranged in a horizontal direction, each column including one or more paragraphs of the plurality of paragraphs;
   obtaining one or more qualified columns based on one or more of a width, an area, a number of character lines and a character line inclination of a column;
   for the one or more paragraphs included in each of at least some of the one or more qualified columns, determining a main paragraph in the qualified column based on a first criterion related to geometric information of a paragraph;
   for each of the qualified columns, if a geometric relationship between a non-main paragraphs and the main paragraph in the qualified column satisfies a second criterion on geometric relationship for adding a main paragraph, classifying the non-main paragraph as an additional main paragraph to the main paragraph;
   performing character recognition on the image to obtain character data; and
   selectively converting only character data in a main paragraph or an additional main paragraph into sound data.

2. The layout analysis method according to claim 1, wherein the dividing the plurality of paragraphs into one or more columns arranged in a horizontal direction comprises:
   determining one or more column-division basis paragraphs from the plurality of paragraphs, the one or more column-division basis paragraphs being paragraphs of the plurality of paragraphs that have a larger width than the other paragraphs; and
   for a common paragraph of the plurality of paragraphs that is not a column-division basis paragraph, if the common paragraph and a column-division basis paragraph satisfy a first predetermined geometric relationship, dividing the common paragraph into the column to which the column-division basis paragraph belongs,
   wherein the necessary condition for satisfying the first predetermined geometric relationship comprises either of conditions a and b,
   the condition a comprises: an overlap rate between the common paragraph and the column-division basis paragraph in the horizontal direction being not less than a first threshold overlap rate, and
   the condition b comprises: the ratio of the width of the common paragraph to the width of a first column-division basis paragraph being not less than a threshold width ratio, and an overlap rate between the common paragraph and the first column-division basis paragraph in the horizontal direction being greater than a second threshold overlap rate, wherein the first column-division basis paragraph is the paragraph of the plurality of paragraphs that has the largest width, and the second threshold overlap rate is less than or equal to the first threshold overlap rate.

3. The layout analysis method according to claim 2, wherein the determining one or more column-division basis paragraphs from the plurality of paragraphs comprises:
   taking the paragraph of the plurality of paragraphs that has the largest width as a first column-division basis paragraph;
   for an alternative paragraph of the plurality of paragraphs that is different from the first column-division basis paragraph, if the alternative paragraph and the first column-division basis paragraph satisfy a second predetermined geometric relationship, taking the alternative paragraph as a second column-division basis paragraph,
   wherein the necessary condition for satisfying the second predetermined geometric relationship comprises condition c,
   the condition c comprises: the ratio of the width of the alternative paragraph to the width of the first column-division basis paragraph being not less than a threshold width ratio, and an overlap rate between the alternative paragraph and the first column-division basis paragraph in the horizontal direction being not greater than a second threshold overlap rate.

4. The layout analysis method according to claim 1, wherein the first criterion is based on at least one of following factors: a width of a paragraph, an area of the paragraph, a number of character lines in the paragraph, and a distance of a center point of the paragraph from a center point of the image,
   wherein the determining a main paragraph in the qualified column based on a first criterion related to the geometric information of a paragraph comprises:
   for each paragraph in the qualified column, obtaining at least one scores of the paragraph respectively based on at least one of the factors of the width of the paragraph, the area of the paragraph, the number of character lines in the paragraph, and the distance of the center point of the paragraph from the center point of the image;

weighted summing the at least one scores based on the respective factors to obtain a weighted score of the paragraph; and taking the paragraph that has a highest weighted score as the main paragraph in the qualified column.

5. The layout analysis method according to claim 1, wherein the geometric relationship for adding a main paragraph comprises at least one of:

an average character line height relationship, a character line inclination relationship, a paragraph border relationship, and a paragraph overlap rate relationship.

6. The layout analysis method according to claim 1, wherein for each of the qualified columns, if one or more non-main paragraphs and the main paragraph in the qualified column satisfy the geometric relationship for adding a main paragraph, the classifying the non-main paragraph as additional main paragraph to the main paragraph comprises:

for a non-main paragraph, if an average character line height difference between the non-main paragraph and the main paragraph is greater than a threshold height difference or a character line inclination difference between the non-main paragraph and the main paragraph is greater than a third threshold inclination, classifying the non-main paragraph not as an additional main paragraph to the main paragraph.

7. The layout analysis method according to claim 1, wherein for each of the qualified columns, if one or more non-main paragraphs and the main paragraph in the qualified column satisfy the geometric relationship for adding a main paragraph, the classifying the non-main paragraph as additional main paragraph to the main paragraph comprises:

for a non-main paragraph, if an average character line height difference between the non-main paragraph and the main paragraph is not greater than a threshold height difference and a character line inclination difference between the non-main paragraph and the main paragraph is not greater than a third threshold inclination, determining whether the non-main paragraph and the main paragraph in the qualified column satisfy a paragraph border relationship and a paragraph overlap rate relationship, and if the non-main paragraph and the main paragraph satisfy the paragraph border relationship and an overlap rate between the non-main paragraph and the main paragraph is not less than a third threshold overlap rate, classifying the non-main paragraph as an additional main paragraph to the main paragraph.

8. The layout analysis method according to claim 1, wherein for each of the qualified columns, if the one or more non-main paragraphs and the main paragraph in the qualified column satisfy the geometric relationship for adding a main paragraph, the classifying the non-main paragraph as additional main paragraph to the main paragraph comprises:

for a non-main paragraph, if the non-main paragraph and the main paragraph do not satisfy a paragraph border relationship or an overlap rate therebetween is less than a third threshold overlap rate, classifying the non-main paragraph not as an additional main paragraph to the main paragraph.

9. The layout analysis method according to claim 1, further comprising:

an act of, after the additional main paragraph is obtained, selecting, based on the additional main paragraph, a non-main paragraph in the qualified column that satisfy the geometric relationship for adding a main paragraph as another additional main paragraph; and repeating the act until there is no more non-main paragraph in the qualified column that satisfy the geometric relationship for adding a main paragraph.

10. A reading assisting device, comprising:

a sensor configured to acquire an image;

an integrated circuit including:

a first circuitry unit configured to execute following acts:

grouping, based on coordinate information of a plurality of paragraphs in an image, the plurality of paragraphs into one or more columns arranged in a horizontal direction, each column including one or more paragraphs of the plurality of paragraphs;

obtaining one or more qualified columns based on one or more of a width, an area, a number of character lines and a character line inclination of a column;

for the one or more paragraphs included in each of at least some of the one or more qualified columns, determining a main paragraph in the qualified column based on a first criterion related to geometric information of a paragraph;

for each of the qualified columns, if a geometric relationship between a non-main paragraph and the main paragraph in the qualified column satisfies a second criterion on geometric relationship for adding a main paragraph, classifying the non-main paragraph as an additional main paragraphs to the main paragraph;

a second circuitry unit configured to perform character recognition on the image to obtain character data; and a third circuit unit configured to selectively convert only character data in a main paragraph or an additional main paragraph into sound data; and a sound output device configured to output the sound data.

11. The reading assisting device according to claim 10, wherein the dividing the plurality of paragraphs into one or more columns arranged in a horizontal direction comprises:

determining one or more column-division basis paragraphs from the plurality of paragraphs, the one or more column-division basis paragraphs being paragraphs of the plurality of paragraphs that have a larger width than the other paragraphs;

for a common paragraph of the plurality of paragraphs that is not a column-division basis paragraph, if the common paragraph and a column-division basis paragraph satisfy a first predetermined geometric relationship, dividing the common paragraph into the column to which the column-division basis paragraph belongs, wherein the necessary condition for satisfying the first predetermined geometric relationship comprises either of conditions a and b, the condition a comprises: an overlap rate between the common paragraph and the column-division basis paragraph in the horizontal direction being not less than a first threshold overlap rate, and the condition b comprises: the ratio of the width of the common paragraph to the width of a first column-division basis paragraph being not less than a threshold width ratio, and an overlap rate between the common paragraph and the first column-division basis paragraph in the horizontal direction being greater than a second threshold overlap rate, wherein the first column-division basis paragraph is the paragraph of the plurality of paragraphs that has the largest width, and the second threshold overlap rate is less than or equal to the first threshold overlap rate.

12. The reading assisting device according to claim 11, wherein the determining one or more column-division basis paragraphs from the plurality of paragraphs comprises:

taking the paragraph of the plurality of paragraphs that has the largest width as a first column-division basis paragraph;

for an alternative paragraph of the plurality of paragraphs that is different from the first column-division basis paragraph, if the alternative paragraph and the first column-division basis paragraph satisfy a second predetermined geometric relationship, taking the alternative paragraph as a second column-division basis paragraph, wherein the necessary condition for satisfying the second predetermined geometric relationship comprises condition c, the condition c comprises: the ratio of the width of the alternative paragraph to the width of the first column-division basis paragraph being not less than a threshold width ratio, and an overlap rate between the alternative paragraph and the first column-division basis paragraph in the horizontal direction being not greater than a second threshold overlap rate.

13. The reading assisting device according to claim 10, wherein the first criterion is based on at least one of following factors: a width of a paragraph, an area of the paragraph, a number of character lines in the paragraph, and a distance of a center point of the paragraph from a center point of the image, wherein the determining the main paragraph in the qualified column based on the first criterion related to the geometric information of the paragraph comprises:

for each paragraph in the qualified column, obtaining at least one score for the paragraph respectively based on at least one of the factors of the width of the paragraph, the area of the paragraph, the number of character lines in the paragraph, and the distance of the center point of the paragraph from the center point of the image;

weighted summing the at least one score based on the respective factors to obtain a weighted score of the paragraph; and taking a paragraph that has a highest weighted score as the main paragraph in the qualified column.

14. The reading assisting device according to claim 10, for each of the qualified columns, if one or more non-main paragraphs and the main paragraph in the qualified column satisfy the geometric relationship for adding a main paragraph, the classifying the non-main paragraph as the additional main paragraph to the main paragraph comprises:

for a non-main paragraph, if an average character line height difference between the non-main paragraph and the main paragraph is greater than a threshold height difference or a character line inclination difference between the non-main paragraph and the main paragraph is greater than a third threshold inclination, taking the non-main paragraph not as an additional main paragraph to the main paragraph.

15. The reading assisting device according to claim 10, wherein for each of the qualified columns, if one or more non-main paragraphs and the main paragraph in the qualified column satisfy the geometric relationship for adding a main paragraph, the classifying the non-main paragraph as additional main paragraph to the main paragraph comprises:

for a non-main paragraph, if an average character line height difference between the non-main paragraph and the main paragraph is not greater than a threshold height difference and a character line inclination difference between the non-main paragraph and the main paragraph is not greater than a third threshold inclination, determining whether the non-main paragraph and the main paragraph in the qualified column satisfy a paragraph border relationship and a paragraph overlap rate relationship, and if the non-main paragraph and the main paragraph satisfy the paragraph border relationship and an overlap rate between the non-main paragraph and the main paragraph is not less than a third threshold overlap rate, classifying the non-main paragraph as an additional main paragraph to the main paragraph.

16. The reading assisting device according to claim 10, wherein the chip circuit further comprises a circuit configured to execute the following:

an act of, after the additional main paragraph is obtained, selecting, based on the additional main paragraph, the non-main paragraph in the qualified column that satisfy the geometric relationship for adding a main paragraph as another additional main paragraphs; and repeating the act until there is no more non-main paragraph in the qualified column that satisfy the geometric relationship for adding a main paragraph.

17. A non-transitory computer readable storage medium storing executable instructions that, when executed by a processor of an electronic device, cause the electronic device to execute the following acts:

grouping, based on coordinate information of a plurality of paragraphs in an image, the plurality of paragraphs into one or more columns arranged in a horizontal direction, each column including one or more paragraphs of the plurality of paragraphs;

obtaining one or more qualified columns based on one or more of a width, an area, a number of character lines and a character line inclination of a column;

for one or more paragraphs included in each of at least some of the one or more qualified columns, determining a main paragraph in the qualified column based on a first criterion related to geometric information of a paragraph;

for each of the columns, if a geometric relationship between a non-main paragraphs and the main paragraph in the column satisfies a second criterion on geometric relationship for adding a main paragraph, classifying the non-main paragraph as an additional main paragraph to the main paragraph;

performing character recognition on the image to obtain character data; and selectively converting only character data in a main paragraph or an additional main paragraph into sound data according to a layout analysis result.

18. The non-transitory computer readable storage medium according to claim 17, wherein the first criterion is based on at least one of following factors: a width of a paragraph, an area of the paragraph, a number of character lines in the paragraph, and a distance of a center point of the paragraph from a center point of the image, wherein the determining a main paragraph in the qualified column based on a first criterion related to the geometric information of a paragraph comprises:

for each paragraph in the qualified column, obtaining at least one score of the paragraph respectively based on at least one of the factors of the width of the paragraph, the area of the paragraph, the number of character lines in the paragraph, and the distance of the center point of the paragraph from the center point of the image;

weighted summing the at least one score based on the respective factors to obtain a weighted score of the paragraph; and taking the paragraph that has a highest weighted score as the main paragraph in the qualified column.

19. The non-transitory computer readable storage medium according to claim 17, wherein for each of the columns, if one or more non-main paragraphs and the main paragraph in the column satisfy the geometric relationship for adding a main paragraph, the classifying the non-main paragraph as the additional main paragraph to the main paragraph comprises:

for a non-main paragraph, if an average character line height difference between the non-main paragraph and the main paragraph is not greater than a threshold height difference and a character line inclination difference between the non-main paragraph and the main paragraph is not greater than a third threshold inclination, determining whether the non-main paragraph and the main paragraph in the column satisfy a paragraph border relationship and a paragraph overlap rate relationship, and if the non-main paragraph and the main paragraph satisfy the paragraph border relationship and an overlap rate between the non-main paragraph and the main paragraph is not less than a third threshold overlap rate, classifying the non-main paragraph as an additional main paragraph to the main paragraph.

20. The non-transitory computer readable storage medium according to claim 17, the program further comprising instructions that, when executed by a processor of an electronic device, cause the electronic device to execute the following steps:

after the additional main paragraph is obtained, selecting, based on the additional main paragraph, the non-main paragraphs in the column that satisfy the geometric relationship for adding a main paragraph as further additional main paragraphs; and repeating the step until there is no more non-main paragraph in the column that satisfy the geometric relationship for adding a main paragraph.

\* \* \* \* \*